UNITED STATES PATENT OFFICE.

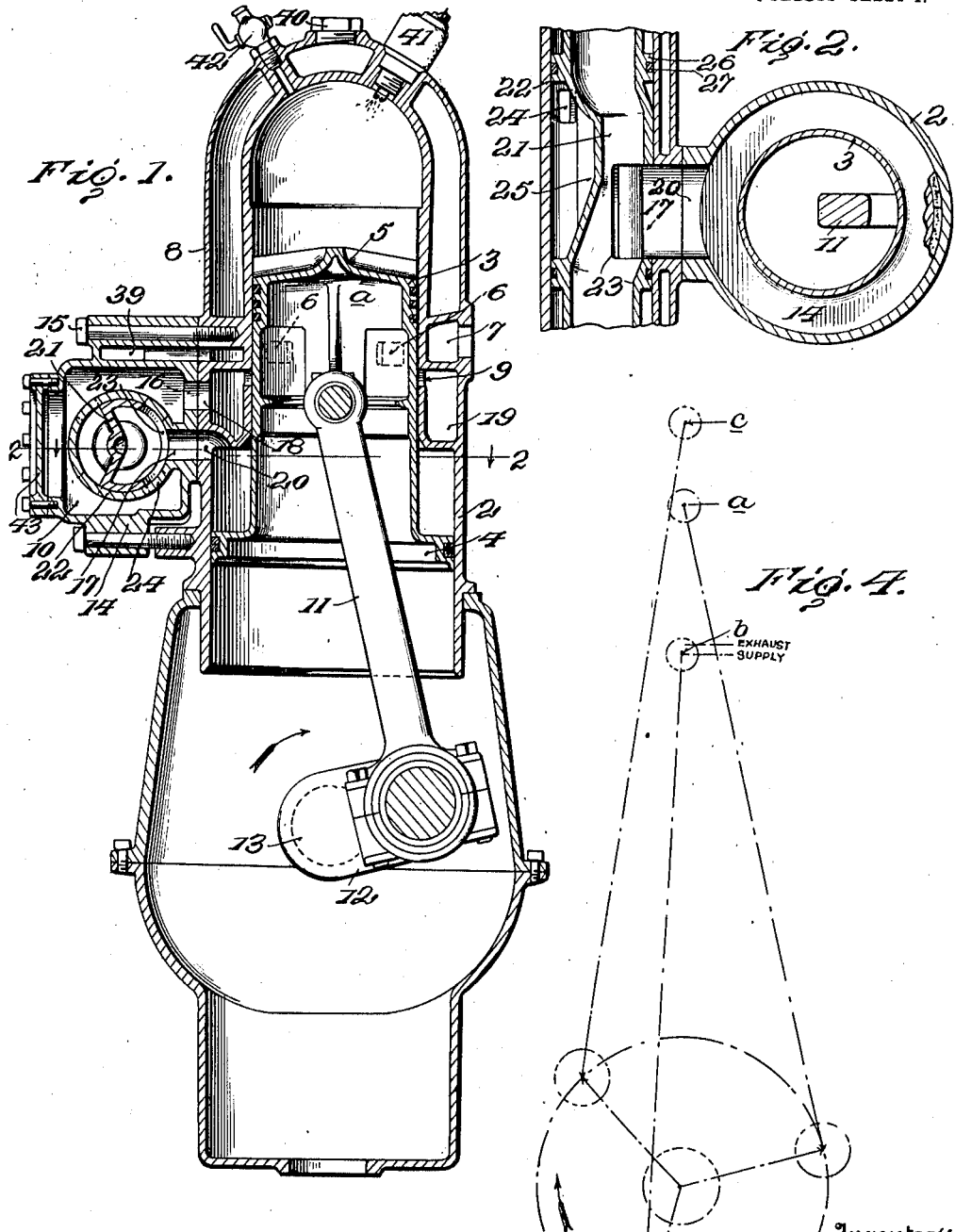

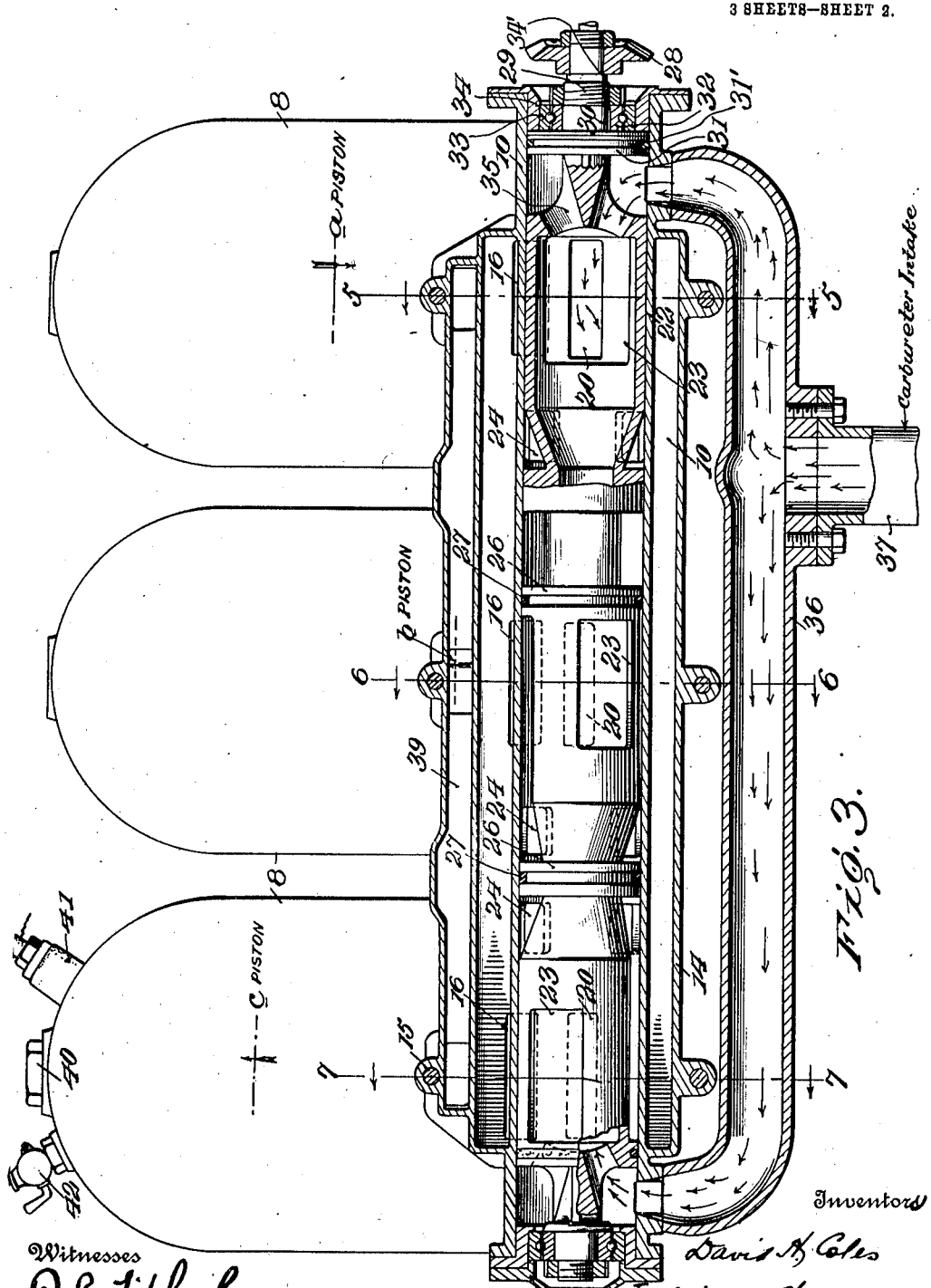

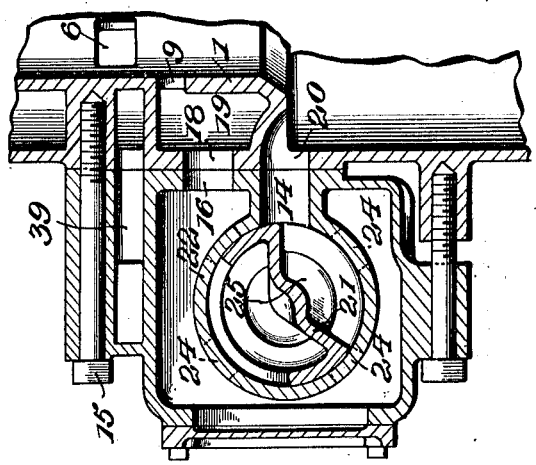
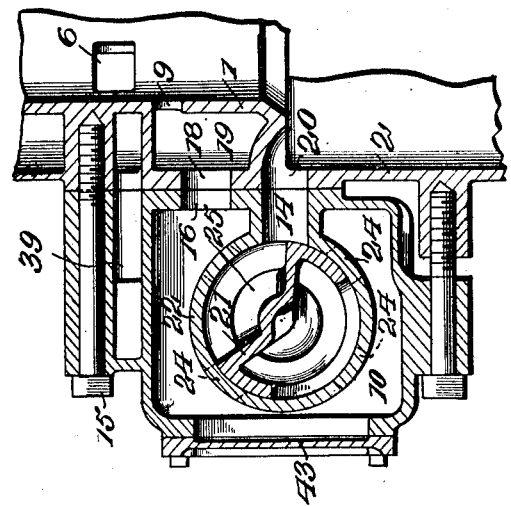
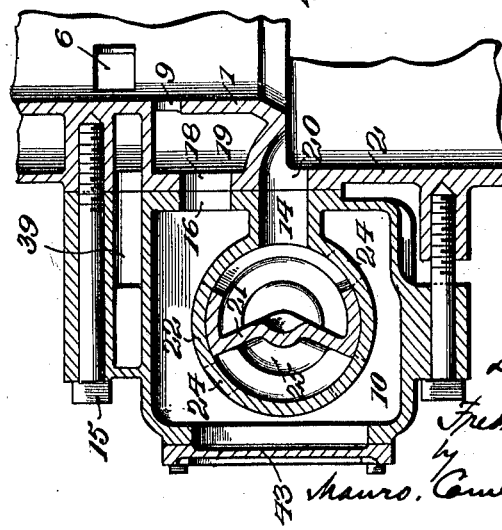

DAVID H. COLES, OF BROOKLYN, NEW YORK, AND FREDERICK CHARAVAY, OF JERSEY CITY, NEW JERSEY, ASSIGNORS, BY MESNE ASSIGNMENTS, TO REQUA MOTOR COMPANY, A CORPORATION OF NEW YORK.

INTERNAL-COMBUSTION ENGINE.

1,020,128.     Specification of Letters Patent.     Patented Mar. 12, 1912.

Application filed May 13, 1910. Serial No. 561,035.

*To all whom it may concern:*

Be it known that we, DAVID H. COLES, of Brooklyn, New York, and FREDERICK CHARAVAY, of Jersey City, New Jersey, have invented a new and useful Improvement in Internal-Combustion Engines, which invention is fully set forth in the following specification.

This invention relates to improvements in internal combustion engines, and particularly to charging and distributing devices for use with engines of this kind, and has for its object to enable each charge of gas mixture delivered to the power cylinder or cylinders to be of the same volume and under the same pressure, to be thoroughly mixed, and of uniform composition, and to insure the pressure of the charge in the power cylinder at the beginning of each compression stroke equal to or above atmospheric pressure, whereby increased power is secured, while economizing in fuel and securing simplicity of construction.

Heretofore more or less difficulty has arisen in filling the power cylinder with a gas charge at atmospheric pressure or above when the engine is running at full speed in consequence of the manner of taking in the charge. Often the constituents of the charge are not thoroughly commingled, thereby interfering with the rapid and complete combustion necessary for securing the greatest efficiency. A further difficulty arises in the variable richness of successive charges whereby the power of the stroke is not constant, giving rise to undesirable engine vibration with consequent increased wear of the parts.

By means of our invention we secure the objects above described and overcome the objections referred to in great part, if not entirely.

Our invention resides primarily in an internal combustion engine of the multiple power cylinder type with a gas distributing and storage means whereby each charge of gas delivered to the cylinders shall be of the same volume and pressure, and of uniform richness and composition.

We have herein shown and described one form of our invention, and the one which we prefer to use, and it consists in combination with a plurality of differential cylinders cranked to one power shaft of a stationary storage and compression chamber having ports which are adapted to connect the chamber with each of the power cylinders; of a rotary intake valve preferably located within said stationary chamber and having a valve casing, which is provided with ports and openings which permit communication between the hollow intake member and the larger of the differential cylinders and between the latter and the storage chamber, whereby carbureted air, for example, may pass from the carbureter through the rotary valve to each of the larger cylinders intermittently, and be delivered from the latter through the valve casing where the gases are thoroughly mixed, to the storage chamber for use in the power cylinders. The intake valve may assume various forms and may be located inside the storage chamber or outside of the same. For compactness we prefer to arrange it inside the chamber as herein shown and described. The movable intake member may be arranged to rotate or reciprocate within its casing.

While our improvements are described in connection with engines of the two cycle type and single acting, we do not desire to be limited to such use, as they are capable of use with four-cycle engines, and in double acting cylinders.

For the sake of clearness we have omitted to illustrate power transmitting means between the power shaft of the engine and the movable manifold, and adjuncts, such as the carbureter, since these means are well understood in the art and can be readily supplied.

The inventive idea involved is capable of receiving a variety of mechanical expressions, one of which, for the purpose of illustration, is shown in the accompanying drawings, but such drawings are not for the purpose of indicating the limits of the invention, reference being had to the claims for this purpose.

In the drawings—Figure 1 is a view in vertical section of one of a plurality of differential engine cylinders provided with our improvements; Fig. 2 is a horizontal sectional view on line 2—2 of Fig. 1, showing one portion of the intake manifold; Fig. 3 is a view partly in vertical section and partly in elevation showing the intake manifold in connection with a plurality of power cylinders; Fig. 4 is a diagram showing the relation of the pistons in three power cylinders working on the shaft; Figs. 5, 6 and 7 are views in transverse vertical section in lines 5—5, 6—6 and 7—7 of Fig. 3.

Fig. 1 shows in vertical section one of a plurality of two cycle internal combustion engines provided with a storage and compression chamber opening into the power cylinder and into a coaxial pump cylinder and an intake manifold in the compression chamber adapted to deliver gases from a carbureter, not shown, to the pump cylinder and to control the delivery of gases from the pump cylinder to the compression chamber.

1 is a power cylinder coaxial with which, and of larger diameter, is a compression pump cylinder 2. In cylinders 1 and 2 are pistons 3 and 4, the former of which is preferably provided on its face with open radial channels 5 adapted to deflect the incoming charge of fresh gases upward in a central column to better clear the power cylinder of burned gases. Each power cylinder is preferably provided with a plurality of exhaust ports 6 which communicate with an annular conduit 7 opening to the atmosphere. The walls of the conduit are cooled by the fluid circulating in jacket 8. Each power cylinder is also provided with gas supply intake ports 9 which are in communication with a storage and compression chamber 10 common to all the cylinders. In the illustration (Fig. 3) three power cylinders are shown; the trunk piston in each is connected by a pitman 11 and crank 12 to a shaft 13. The angular displacement of the three pistons on the crank shaft is 120°. The positions of the exhaust ports above the lowermost position of the power piston is such that exhaust from any one cylinder occupies about 60° in rotation of the power shaft. This is indicated in the diagram, Fig. 4, which is self-explanatory.

The compression chamber 10 is preferably made detachable from the engine, and of any desired dimensions to correspond with the size and number of power cylinders to be supplied. It may be made integral in whole or in part. By way of illustration it is shown in Fig. 3 as made in a single piece to accommodate three engine cylinders. The compression chamber 10 here illustrated comprises an outer wall 14 which is adapted to be made fast to the engine structure by means of threaded bolts 15. On the side of the compression chamber 10, facing the engine cylinders, are pairs of openings 16 and 17. Opening 16 registers with a corresponding opening 18 in the wall of an annular chamber 19 communicating with the power cylinder 1 through inlet ports 9. Opening 17 registers with the combined inlet and outlet port 20 of compression cylinder 2. The same arrangement occurs with each engine, as shown in Fig. 3. Each pump cylinder 2 is supplied with gas from a carbureter or other source of combustible gas mixture through a rotary intake valve consisting of a movable hollow member 21 provided with as many exit ports 23 as there are pump cylinders to be supplied with gas for compression. The several ports 23 are angularly displaced relatively to each other to correspond with the angular displacement of the pistons on the power shaft. Opposite each port 23 in the movable tubular wall of member 21 is a depression which with the wall 22 of the stationary casing forms a receiving channel 25 closed at its ends by collars 26 provided with gaskets 27. A portion of the wall of tubular member 21 adjacent opening 23 is ground to fit the inside of the casing wall 22 to make sliding contact therewith and thereby act to open the close communication between the intake valve and the pump cylinder during a period of its movement, and to open the pump cylinder and compression chamber 10 during the remaining period of its movement. The movable intake member 21 is provided with means for receiving power from the main shaft, such as a drive-gear 28 fast to a hub 29 which is fast to, or a part of, the intake member. For the purpose of reducing friction and also making a tight end closure for the compression chamber, a combined ball-bearing and packing means are provided. To this end a sleeve 30 carrying a packing ring 31 is splined to hub 29 and rotates therewith. Mounted on sleeve 30 are members 32, 33 of a ball bearing washer which fits within a bushing 34 and is held in place by a nut 34'. The opposite end of the intake manifold is preferably mounted in a similar manner, except that a cap 35 is secured over the end of the bearing to effect a tight closure, thereby rendering a packing unnecessary. While we have described in some detail the combined bearings and means for closing the ends of the compression chamber 10, it is obvious that other means to effect this result may be used.

The movable member 21 is preferably provided with openings 35 at its opposite ends for receiving the gas mixture delivered thereto by a supply pipe 36 leading from a carbureter intake 37.

The power cylinders taken for illustration are provided with cooling jackets and have communication with a fluid circulating system through a chamber 39 common to all the jackets and connections 40 individual thereto. Each engine is provided with a sparking plug 41 and valved vent cock 42. For the purpose of facilitating access to the compression chamber for inspection or other purposes, removable closures 43 are provided, secured in place by bolts or other fastening means. Only one of such closures has been illustrated, although several are preferably provided.

The operation of the device as thus far described is as follows:—It will be assumed that the device above described is used in connection with three engine cylinders, and the three pistons are at the moment in positions c, a, b, as indicated in the diagram Fig. 4. The rotary valve 21 will be positioned in its casing 22 with its outlet openings 23 in the angular positions shown, respectively, in Figs, 7, 5 and 6. It is further assumed that exhaust takes place in each cylinder while the crank-arm sweeps through about 60° of arc.

Referring more particularly to Fig. 1, piston 5 is descending on its power stroke, as the result of a previous explosion. The rotary valve 21 has its port 23 open to pump cylinder 2, thereby permitting piston 4 to draw in a charge of gas from a carbureter or other source of gas during its down stroke. The port 23 remains open and registers with the passage to the compression pump 2 during one down stroke of the piston, or during one-half revolution of the intake manifold. As the power piston 1 descends it uncovers exhaust ports 6 and permits discharge of the burned gases therethrough and into the annular chamber 7 from which they escape to the atmosphere. During further advance of the power piston to the end of its stroke, ports 9 are uncovered and gas previously compressed and stored in the compression chamber 10 rushes into the cylinder in jets which are directed upward by the deflecting surfaces 5 on the piston face, thereby facilitating expulsion of the burned charge and filling the cylinder with a fresh charge at or above atmospheric pressure. At the end of the power stroke the pump piston 4 has filled cylinder 2 with fresh gas drawn in by way of the rotary intake valve 21 and port 23. The moment piston 5 begins its up-stroke, the port 23 passes out of register with the passage to the pump, which is no longer in communication with the interior of the intake valve, but is put into communication with compression chamber 10 through the channel 25, as will clearly appear by reference to Fig. 6, which shows the position of the movable rotary valve at or near this moment. While the charge in the power cylinder is being compressed the pump is compressing a fresh charge into the compression chamber 10 by way of mixing-chamber 25 wherein the charge is thoroughly mixed before entering the compression chamber. As the power piston 5 nears the end of its compression stroke, the port 23 is again brought into position to deliver gases into the pump while the power cylinder remains closed to the compression chamber during the next power stroke. This completes the cycle of operations for one revolution of the rotary intake valve 21 and power-shaft 13 in respect to the a piston.

While the same cycle of operations as above described is repeated with each cylinder, the parts are so related however, that gas compression into compression-chamber 10 which feeds the power cylinders is continuous. The compression chamber is not however continuously open to the atmosphere through the engine exhaust ports, but is closed entirely to the atmosphere intermittently. This closure of the compression chamber intermittently permits pressure to build up and be maintained therein, and thereby facilitates the transfer of the charges to the power cylinders when the intake port is uncovered by its piston. This maintenance of pressure also insures a full charge of gas in the power cylinder for each stroke at or near atmospheric pressure. Each charge is of the same volume, of the same pressure and richness, and thoroughly mixed, thereby insuring constant power at each stroke, even running, and reduction of vibration and wear to a minimum. Little power is consumed by the pumps for the reasons that by their action a portion of the stroke of each pump piston transfers a charge to the compression chamber 10 while it is open to atmosphere through an engine cylinder at time of exhaust. While the constant pressure maintained in the compression chamber is not intended to be great, it is sufficient to secure the results described.

We do not herein make any claim to the valve-body shown and described, because the same forms the subject-matter of our joint application Serial No. 672,049, filed January 19th, 1912.

What is claimed is:

1. In an internal combustion engine, the combination of a plurality of power cylinders and of pump cylinders, a stationary compression chamber communicating with each of said power cylinders, a valve casing within said chamber having ports opening into said chamber and into said pump cylinders and a rotary intake valve having ports adapted to register with the valve casing ports leading to said pump cylinders and having exterior channels for placing said pumps in communication with said chamber.

2. In an internal combustion engine, the combination of a plurality of power cylinders and of pump cylinders, a stationary compression chamber communicating with said power cylinders, a valve casing having ports opening into said chamber and into said pump cylinders, a rotary gas intake valve therein open at both ends to a gas supply and having ports and channels adapted to place each pump in communication with a gas supply and with said chamber during each revolution of the engine.

3. In an internal combustion engine, the combination of a plurality of power cylinders and of pump cylinders, a stationary compression chamber communicating with said pump cylinders, a valve casing having ports opening into said chamber and other ports opening into said pump cylinders, a rotary gas intake valve open to a gas supply at both ends and having ports adapted to place said pumps in communication with said intake valve and having channels adapted to place said pumps in communication with said chamber and packing rings intermediate the ends of said channels.

4. In an internal combustion engine, the combination of a plurality of power cylinders and of pump cylinders, a stationary compression chamber communicating with said power cylinders, a valve casing in said chamber having ports opening into said chamber and into said pump cylinders, a rotary gas intake valve therein having ports and channels adapted to place each pump in communication with a gas supply and with said chamber as the valve rotates, said valve being provided with packing rings intermediate said channels and a gas supply conduit opening into both ends of said valve.

5. In an internal combustion engine, the combination of a plurality of power cylinders and pump cylinders, a stationary compression chamber having communication with said cylinders and rotary gas intake valve means within said chamber for controlling supply of gas to said chamber through said pump cylinders.

6. In an internal combustion engine, the combination of a plurality of power cylinders and pump cylinders, a stationary compression chamber having communication with said cylinders, rotary gas intake valve means within said chamber for controlling supply of gas to said chamber through said pump cylinders and means supplying gas to both ends of said gas intake valve means.

In testimony whereof we have signed this specification in the presence of two subscribing witnesses.

DAVID H. COLES.
FREDERICK CHARAVAY.

Witnesses:
C. A. L. MASSIE,
RALPH L. SCOTT.